UNITED STATES PATENT OFFICE.

EDWIN C. WRIGHT, OF NEWPORT, KENTUCKY, ASSIGNOR, BY MESNE ASSIGNMENTS, TO ALLIS-CHALMERS MANUFACTURING COMPANY, A CORPORATION OF DELAWARE.

SYSTEM OF DISTRIBUTION.

1,134,659.      Specification of Letters Patent.      Patented Apr. 6, 1915.

Application filed September 3, 1907. Serial No. 391,173.

*To all whom it may concern:*

Be it known that I, EDWIN C. WRIGHT, a citizen of the United States, residing at Newport, in the county of Campbell and State of Kentucky, have invented certain new and useful Improvements in Systems of Distribution, of which the following is a full, clear, and exact specification.

My invention relates to connecting dynamo-electric machines in parallel, especially when such machines are not all similar.

If two or more dynamo-electric machines are connected in parallel across a supply circuit, it is necessary that there be some interconnection between them in order that they may divide the load properly. This has ordinarily been accomplished by an "equalizer," which is generally connected to each machine at a point between its armature and its series field winding. So far as I am aware, however, the use of such an equalizer has heretofore been confined to cases where the machines are substantially similar and where they have not been provided with anti-sparking windings.

It is one object of my present invention to provide means whereby two or more dynamo-electric machines may be connected in parallel across a supply circuit and yet divide the load proportionately between them, even though they are dissimilar or though some or all of them have anti-sparking windings.

A further object is to provide means whereby in case the dissimilarity exists because one or more of said machines are provided with anti-sparking windings, the variations of current in such anti-sparking windings will be proportional to those in the armatures with which they are respectively associated.

In attaining these objects certain novel features are used which will appear from the description and drawings and will be particularly pointed out in the claims.

Figure 1:
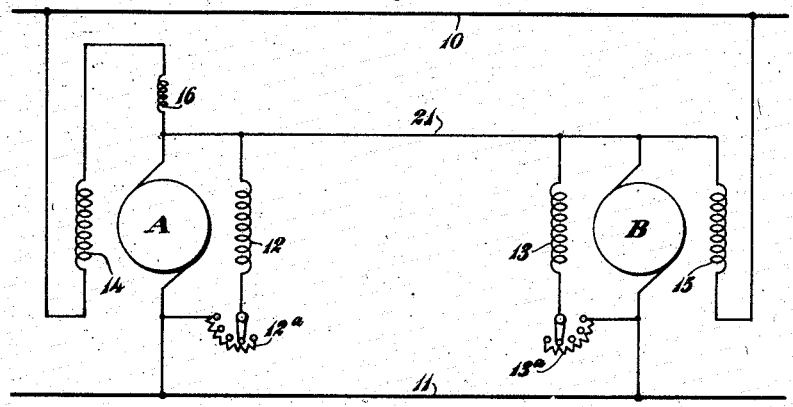
Figure 2:
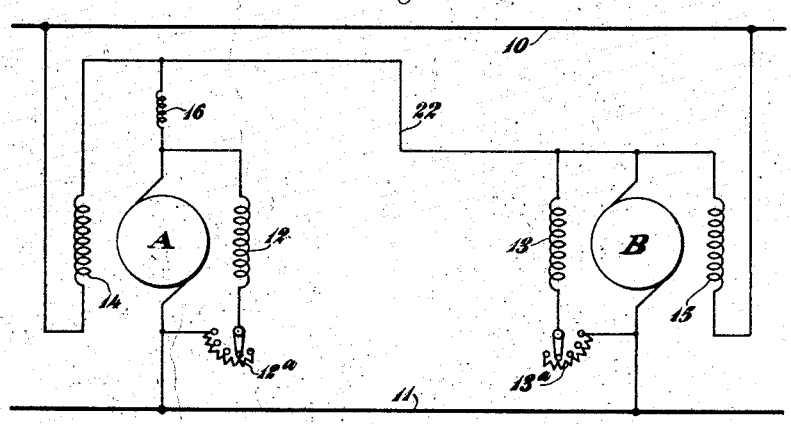
Figure 3:
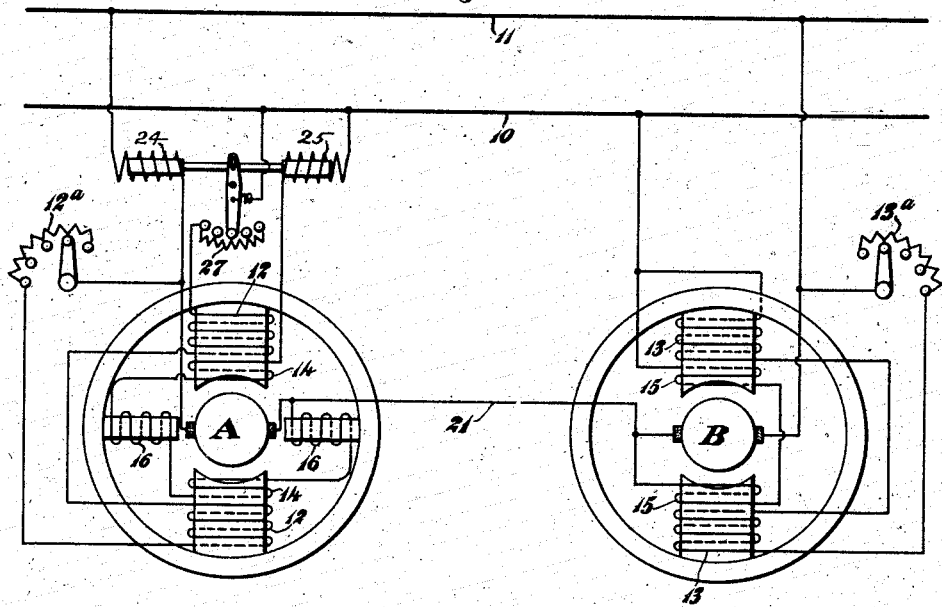
Figure 4:
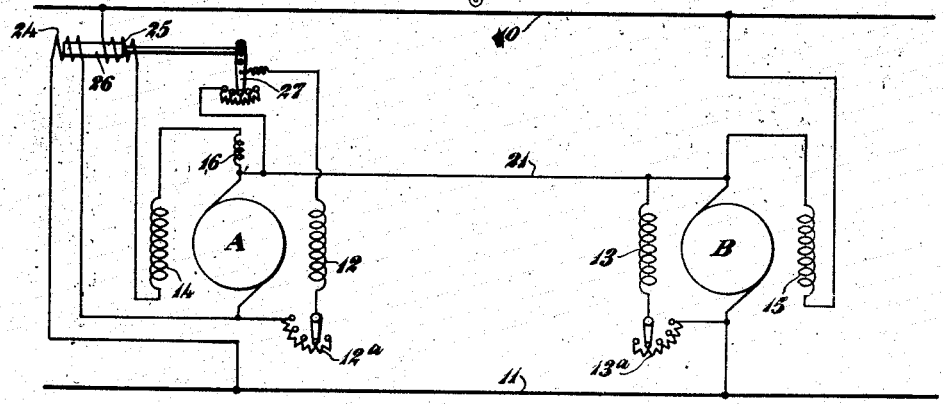

Figures 1 and 2 show simple connection diagrams of systems to the improvement of the operation of which my invention is applicable. Fig. 3 shows a more complete diagram of the preferred embodiment of my invention; and Fig. 4 is a connection diagram showing in simpler form the connections of Fig. 3, but with the shunt field windings connected in short shunt instead of in long shunt.

In all of the figures, two dynamo-electric machines A and B are connected in parallel across the mains 10 and 11 of a supply circuit. These machines may be either motors or generators. The machines A and B are provided with shunt field windings 12 and 13 respectively, which may be connected either in short shunt as in Figs. 1, 2 and 4 or in long shunt as in Fig. 3, and with series field windings 14 and 15. The shunt field windings may be adjusted by manually operated rheostats $12^a$ and $13^a$ respectively. The machine A is also provided with an anti-sparking winding 16, which may be of any desired type but is shown in Fig. 3 as being a commutating winding located on auxiliary poles midway between the main field poles.

In order to cause the two machines to divide the load proportionately between them, whether it be the electrical load which they are carrying as generators, or the mechanical load which they are carrying as motors, it is necessary that some interconnection be provided between them.

In Fig. 1 this interconnection is shown as the equalizer 21, between which and the main 11 the armatures and shunt field windings are connected and between which and the main 10 the series field and commutating windings 14, 15 and 16 are connected, 14 and 16 being in series. This arrangement operates very well to maintain the proportionate division of load between the two machines. Thus if the armature B draws more than its share of the current, the extra current comes partly through its own series field winding 15 and partly through the equalizer and the windings 14 and 16 of the machine A. By the compounding action of the windings 14 and 16, the current is caused to increase in the armature A so that it tends to reassume its share of the load. On the other hand, in case the armature A takes more than its share of the current, by an operation the reverse of that above described the armature B is caused immediately to draw a larger current to relieve the armature A. This action tends to restore the normal ratio between the currents in the two armatures. But while the action of the arrangement shown in Fig. 1 maintains a comparatively stable balance between the currents in the armatures of the different machines, the action is not exact and any inexactness causes the commutating winding 16 to take either more or less current proportionately than the armature A, in which case, either because of too strong or too weak a commutating field, the machine A is liable to spark.

In Fig. 2 is shown an arrangement in which this sparking is obviated. Here the equalizing connection 22 is connected to the machine B as before, but to the machine A at a point between the series-field winding 14 and the commutating field winding 16. Thus the winding 14 is connected between the main 10 and the equalizer while the winding 16 and the armature A are connected in series between the main 11 and the equalizer. With this arrangement the current in the commutating winding is compelled to vary in the same proportion as that in the armature A, and thus no sparking at the commutator of machine A is caused because of too strong or too weak a commutating field. But in the arrangement shown in Fig. 2 the balance between the loads on the two machines is not a stable one, because the compounding action in the machine A is due partly to the series winding 14 and partly to the commutating winding 16. Thus if the machine B takes more than its share of the current the strengths of the windings 14 and 15 are increased proportionately, but since 15 furnishes the entire compounding for the machine B, while 14 furnishes only part of the compounding of the machine A, the current in the armature B tends to rise faster than that in the armature A and to take a still greater share of the current. The reverse action takes place if the unbalancing is reversed. Thus the balance in the arrangement shown in Fig. 2 is unstable.

In the arrangement shown in Figs. 3 and 4 it is endeavored to combine the advantages of both Figs. 1 and 2 while avoiding the disadvantages of both. In this case the equalizer 21 is connected in the same manner as the equalizer in Fig. 1. Solenoids 24 and 25 are connected in the circuits of the armature A and the series field winding 14 respectively and act differentially upon a core 26 to control a rheostat 27 in circuit with one of the shunt field windings, say 12. Upon a disproportionate division of the load between the machines A and B an action similar to that described in connection with Fig. 1 takes place, and, moreover, the solenoid 24 or the solenoid 25 is caused to predominate, moving the core 26 to operate the rheostat 27 to vary the strength in the field winding 12 in the proper direction until the equilibrium between the coils 24 and 25 is restored. Thus if the machine B takes more than its proportionate share of the load, its armature draws current not only through its own series winding 15 but also through equalizer 21 and the windings 14 and 16 of the machine A. By the compounding action of 14 and 16, the armature A is caused to draw more current. Moreover, the solenoid 25, being in series with the winding 14, responds to this increased current in the latter and causes such movement of the rheostat 27 that the field winding 12 is properly varied to cause the armature A to take more current, thus also tending to restore the ratio between the currents in the armatures of the two machines to its normal value. Upon such restoration, which with this arrangement may be almost or quite complete, current ceases to flow in the equalizer 21 and the ratio between the currents in the armature A and in the commutating winding 16 is also restored to normal.

In the arrangements shown the series field windings are shown as cumulative if the machines are generators and differential if they are motors. However my invention is not limited to such machines.

The rheostat 27 in Figs. 3 and 4 is shown connected as it would be when the machines A and B are generators. When these machines are motors, the rheostat would generally be connected to operate exactly oppositely.

Instead of the rheostat 27 in the shunt field circuit of the machine A, any other desired form of regulating device may be used. In fact it is not necessary that the regulating device be confined to the field of the machine A, as it can be equally as well located in the field circuit of the machine B. Although for the sake of simplicity only two machines are here shown connected in parallel, my system is equally applicable to cases where more than two machines are used.

It should be understood that I do not desire to be limited to the exact details of construction and arrangement shown and described, for obvious modifications will occur to a person skilled in the art.

What I claim as new is:—

1. In combination, a plurality of dynamo-electric machines connected in parallel, at least one but less than all of said machines being provided with anti-sparking windings, and means for maintaining the proportionate division of current between said machines substantially constant and also maintaining the currents in the anti-sparking windings substantially proportional to those in the armatures with which they are respectively associated.

2. In combination, two dynamo-electric machines connected in parallel, one only of said machines being provided with a commutating winding, and means for maintaining the proportionate values of the currents in the armatures of said machines and in said commutating winding substantially constant.

3. In combination, two compound wound dynamo-electric machines connected in parallel, one only of said machines being provided with anti-sparking windings, and means for causing the variations of current in the armatures of the two machines and in said anti-sparking windings to be proportional.

4. In combination, a supply circuit, two compound wound dynamo-electric machines connected in parallel to said supply circuit, one only of said machines being provided with a commutating winding, and means for automatically regulating the strength of current in the shunt field winding of one of said machines to cause the ratio between the currents taken by the armatures of the two machines to remain substantially constant.

5. In combination, a supply circuit, two compound wound dynamo-electric machines connected in parallel to said supply circuit, one only of said machines being provided with a commutating winding, and means for automatically regulating the shunt field winding of one of said machines to cause the ratio between the currents in said commutating winding and in the armature with which it is associated to be maintained substantially constant.

6. In combination, a supply circuit, two compound wound dynamo-electric machines connected in parallel thereto, only one of said dynamo-electric machines being provided with a commutating winding, and automatic means for varying the effect of the shunt field winding of one of said machines to cause the variations of current in the armatures of said two machines and in said commutating winding to be proportional.

7. In combination, a supply circuit, two compound wound dynamo-electric machines connected in parallel to said supply circuit, one only of said machines being provided with a commutating winding, and means for regulating the strength of the current in the shunt field winding of one of said machines to cause the ratio between the currents taken by the armatures of the two machines to remain substantially constant.

8. In combination, a supply circuit, two compound-wound dynamo-electric machines connected in parallel to said supply circuit, one only of said machines being provided with a commutating winding, and means for regulating the shunt field winding of one of said machines to cause the ratio between the currents in said commutating winding and in the armature with which it is associated to be maintained substantially constant.

9. In combination, a supply circuit, two compound-wound dynamo-electric machines connected in parallel thereto, only one of said dynamo-electric machines being provided with a commutating winding, and means for varying the effect of the shunt field winding of one of said machines to cause the variations of current in the armatures of said two machines and in said commutating winding to be proportional.

10. In combination, a supply circuit, two compound-wound dynamo-electric machines connected in parallel to said supply circuit, one only of said machines being provided with a commutating winding, and means for automatically regulating the strength of current in a field winding of one of said machines to cause the ratio between the currents taken by the armatures of the two machines to remain substantially constant.

11. In combination, a supply circuit, two compound-wound dynamo-electric machines connected in parallel to said supply circuit, one only of said machines being provided with a commutating winding, and means for automatically regulating a field winding of one of said machines to cause the ratio between the currents in said commutating winding and in the armature with which it is associated to be maintained substantially constant.

12. In combination, a supply circuit, two compound-wound dynamo-electric machines connected in parallel thereto, only one of said dynamo-electric machines being provided with a commutating winding, and automatic means for varying the effect of one of the field windings of one of said machines to cause the variations of current in the armatures of said two machines and in said commutating winding to be proportional.

13. In combination, a plurality of dynamo-electric machines connected in parallel, at least one of said machines being provided with anti-sparking windings, and means including an automatically-operated member for maintaining the ratios between the currents in the anti-sparking windings and those in the armatures with which they are respectively associated substantially constant.

14. In combination, a plurality of dynamo-electric machines connected in parallel, at least one of said machines being provided with anti-sparking windings, and means including an automatically operated member for causing the proportionate division of current between said machines to be maintained substantially constant.

15. In combination, a plurality of dynamo-electric machines connected in parallel, at least one of said machines being provided with anti-sparking windings, and means including an automatically operated member for maintaining the proportionate division of current between said machines substantially constant and also maintaining the currents in the anti-sparking winding substantially proportional to those in the armatures with which they are respectively associated.

16. In combination, two dynamo-electric machines connected in parallel, one only of said machines being provided with a commutating winding, and means including an automatically operated member for maintaining the ratio of current division between said two machines substantially constant.

17. In combination, a dynamo-electric machine provided with a commutating winding, a second dynamo-electric machine unprovided with a commutating winding and connected in parallel with said first machine, and means including an automatically operated member for maintaining the ratio between the current in said commutating winding and that in the armature of said first machine substantially constant.

18. In combination, two dynamo-electric machines connected in parallel, one only of said machines being provided with a commutating winding, and means including an automatically operated member for maintaining the proportionate flux of the currents in the armatures of said machines and in said commutating winding substantially constant.

19. In combination, a compound wound dynamo-electric machine provided with anti-sparking windings, a second compound-wound dynamo-electric machine connected in parallel with said first machine, and means including an automatically operated member for maintaining the ratio between the currents in the armatures of the two machines substantially constant.

20. In combination, a compound-wound dynamo-electric machine provided with anti-sparking windings, a second compound-wound dynamo-electric machine unprovided with anti-sparking windings and connected in parallel with said first machine, and means including an automatically operated member for causing the variations of current in said anti-sparking windings to be proportional to the variations of current in the armature of said first dynamo-electric machine.

21. In combination, two compound-wound dynamo-electric machines connected in parallel, one only of said machines being provided with anti-sparking windings, and means including an automatically operated member for causing the variations of current in the armatures of the two machines and in said anti-sparking windings to be proportional.

22. In combination, a supply circuit, two compound-wound dynamo-electric machines connected in parallel across said circuit, one only of said machines being provided with series wound commutating poles, an equalizing connection between said two machines, and auxiliary means for causing the proportionate division of the load between said machines to be maintained constant.

In testimony whereof I affix my signature, in the presence of two witnesses.

EDWIN C. WRIGHT.

Witnesses:
OLIVER W. SHARMAN,
FRED J. KINSEY.